United States Patent [19]
Shaffer et al.

[11] Patent Number: 5,991,387
[45] Date of Patent: *Nov. 23, 1999

[54] MONITORING AND CONTROLLING CHANNELS TO IMPROVE THE INTERFACE OF CALLS

[75] Inventors: Shmuel Shaffer, Palo Alto; William J. Beyda, Cupertino; Selena Dilley, San Jose; Henry W. Lambert, Campbell; Phillip Meredith, Palo Alto; Rudolph Bitzinger, Mountain View, all of Calif.

[73] Assignee: Siemens Information and Communications Network, Inc., Boca Raton, Fla.

[*] Notice: This patent issued on a continued prosecution application filed under 37 CFR 1.53(d), and is subject to the twenty year patent term provisions of 35 U.S.C. 154(a)(2).

[21] Appl. No.: 08/829,909

[22] Filed: Mar. 21, 1997

[51] Int. Cl.$^6$ .................................................. H04M 11/00
[52] U.S. Cl. ............................................ 379/211; 379/201
[58] Field of Search ............................... 379/88.13, 88.14, 379/88.15, 88.22, 88.17, 210, 211, 212; 370/440, 455, 459, 461; 348/14, 15

[56] References Cited

U.S. PATENT DOCUMENTS

| | | | |
|---|---|---|---|
| 488,766 | 12/1892 | Ogasawara . | |
| 5,184,345 | 2/1993 | Sahni . | |
| 5,648,971 | 7/1997 | Ogata et al. | 370/421 |
| 5,649,004 | 7/1997 | Ikeno et al. | 379/212 |
| 5,724,407 | 3/1998 | Bruno et al. | 348/14 |
| 5,751,791 | 5/1998 | Chen et al. | 379/142 |
| 5,760,823 | 6/1998 | Brunson et al. | 348/14 |

FOREIGN PATENT DOCUMENTS

| | | |
|---|---|---|
| 0 323 083 | 7/1989 | European Pat. Off. . |
| 0 376 525 | 7/1990 | European Pat. Off. . |
| 0 532 972 | 3/1993 | European Pat. Off. . |
| 0 592 846 | 4/1994 | European Pat. Off. . |

OTHER PUBLICATIONS

CCITT Recommendation 1.252.2, International Telecommunication Union, Geneva, Aug. 1992, 17 pgs.

Horn, D.N. et al: "An ISDN Multimedia Conference Bridge", Proceedings of the Region 10 Conference on Computer and Communication Systems (TENCON), Hong Kong, 24–24 Sept., 1990, vol. 2, Sept. 24, 1990, IEEE, 853–856.

*Primary Examiner*—Daniel S. Hunter
*Attorney, Agent, or Firm*—Heather S. Vance

[57] ABSTRACT

A method is provided for monitoring channels and controlling calls. Multiple channels provided by at least one digital line are monitored. Based on this monitoring, the present invention determines when all of the multiple channels are occupied. At least one of an incoming call and an established call is given priority when all of the multiple channels are busy. The priority is based on predetermined inputs from a user. The call with priority is provided on one of the multiple channels. The present invention then determines when one or more of the multiple channels are available. When one of the multiple channels becomes available, the action based on the call priority is automatically disabled.

7 Claims, 6 Drawing Sheets

MONITORING AND CONTROLLING CHANNELS TO IMPROVE THE INTERFACE OF CALLS

BACKGROUND OF THE INVENTION

1. Field of the Invention

The invention relates to monitoring and controlling channels to improve the interface of calls, and more particularly to a method for monitoring B-channels for an ISDN basic rate line to improve the interface of video and voice calls.

2. Description of the Related Art

ISDN lines are becoming more common in single user environments (e.g., in single resident homes). Similarly, high speed data transmission, internet access, remote LAN access and video transmission is becoming more desirable. For example, telecommuters often use basic-rate interface ISDN lines to obtain high speed data transfer, internet access, remote LAN access and/or video transmission and reception. ISDN is an evolving set of standards for a digital network carrying both voice and data communications. Basic-rate interface ISDN lines are configured to include two bearer (or B) channels and one D-channel (commonly referred to as 2B+D). Each B-channel carries 64 kbps of digitized voice or data. Data is transferred on one or both of the bearer channels and information related to a call is transferred on the D-channel. Thus, the D-channel is the signaling channel. The D-channel carries 16 or 64 kbps, depending on the circuit type.

Currently, to participate in, for example, a high quality video conference, both of the B-channels in the ISDN line are used for data transmission. When this occurs, the voice device handler does not detect that both B-channels are in use. Therefore, if a voice call is received when both B-channels are in use, the switching unit (e.g., a central office or a PBX) attempts to connect the voice call to the user's voice terminal. In this situation, all the available B-channels are already in use, so the voice call cannot be connected. The telephone still rings when an incoming voice call is detected because the ring signal is sent on the available D-channel. As a result, if a user attempts to answer a ringing voice terminal under these circumstances, the user is presented with a dead telephone which is not connected to the incoming voice call.

FIG. 1 illustrates a prior art environment for utilization of an ISDN line. Private Branch Exchange (PBX) 100 is connected to ISDN line 102. Up to eight lines can be connected to this ISDN line, but only two lines can be used at one time because only two B-channels are available on an ISDN line. Video terminal 104 and telephone 106 are connected to PBX 100 via ISDN line 102. In the original configuration for an ISDN line, one voice terminal and one data terminal were envisioned. Each of these terminals were to use only one B-channel. Problems now arise because old software and new data terminals utilizing both B-channels provide high quality video transfer. In addition, problems arise when more than two devices are connected to one ISDN line because only two B-channels are available. When two B-channels are used, the device handler software does not detect the unavailability of the B-channels and attempts to connect a voice call to telephone 106 when both B-channels are used to provide data to video terminal 104. A ring signal is transferred on the D-channel. Therefore, in this example, telephone 106 rings as though a voice call is being provided at telephone 106. As stated above, in this situation, when the user attempts to answer telephone 106, no response is provided.

Similarly, if a user attempts to make a call on telephone 106 when both B-channels are being used to provide data to video terminal 104, the user would receive no response from telephone 106. No visual or audio indications are provided from the voice terminal when the B-channels are unavailable. Depending on the implementation of a particular voice terminal, a local busy tone may be provided on the telephone rather than a dead line. In both circumstances, telephone 106 rings as a result of an incoming call, but the B-channels are unavailable, so the call cannot be received.

Data devices are currently available to provide protection against B-channel contention. These devices simply drop one of the B-channels when a voice call arrives. This arrangement assumes that the user wants to receive the voice call. Additionally, when one of the B-channels is dropped, a degradation of the video display results because the data transmission for the video display is then provided on only one B-channel. To re-establish the full quality video, the user may have to place the video call again which incurs additional line charges. FIG. 2 illustrates an environment for a data device which provides protection against B-channel contention. These data devices are utilized in a central office switch environment. Typically, central office 120 is connected to data device/adapter 124 via ISDN line 122. Adapter 124 is either a card located in video terminal 126 or a separate box. Telephone 128 is directly connected to adapter 124. In this arrangement, when both B-channels are being used to provide a video display to video terminal 126, and an incoming voice call is detected by adapter 124, the user can pick up ringing telephone 128 and receive the voice call. This occurs because adapter 124 drops one of the B-channels and allows the voice call to be provided on that B-channel to telephone 128. In this arrangement, when the user picks up telephone 128, the video display being provided by video terminal 126 immediately degrades in quality.

It is desirable to have an adapter which does not automatically drop a channel and give priority to a voice call. It is also desirable to have a less expensive, configurable adapter which allows the user to determine how incoming calls will be handled when both B-channels are being used.

SUMMARY OF THE INVENTION

According to the invention, a method is provided for monitoring channels and controlling calls. Multiple channels provided by at least one digital line are monitored. Based on this monitoring, the present invention determines when all of the multiple channels are occupied. At least one of an incoming call and an established call is given priority when all of the multiple channels are busy. The priority is based on predetermined inputs from a user. The call with priority is provided on one of the multiple channels. The present invention then determines when one or more of the multiple channels are available. When one of the multiple channels becomes available, the action based on the call priority is automatically disabled.

DETAILED DESCRIPTION

In one embodiment, the present invention prevents incoming calls from ringing a telephone when both B-channels on an ISDN line are occupied. In the preferred embodiment, a voice call is automatically transferred to a voice mail messaging system when there are no B-channels available for that voice call. Therefore, when a voice call is received and both B-channels are occupied, the telephone does not ring. Voice calls are used in the below described embodiments, but the present invention can also be applied to multimedia calls in the same manner. Additionally, a visual indication can be provided on the telephone such that the user knows when both B-channels are occupied. This indication will inform the user that picking up the telephone receiver sends the message that the user wants to give a voice call priority. Thus, if the user picks up the telephone receiver when the indication shows both B-channels are in use, one B-channel which is carrying data will be dropped. This results in a degradation of data transfer. The dropped line is then used for the voice call. The data transfer occurring on the two B-channels can be any type of high speed data transfer. For example, internet access, access to a remote LAN or data transfer for a video conference can be provided on multiple channels such that the resulting quality is greatly enhanced.

Figure 1:
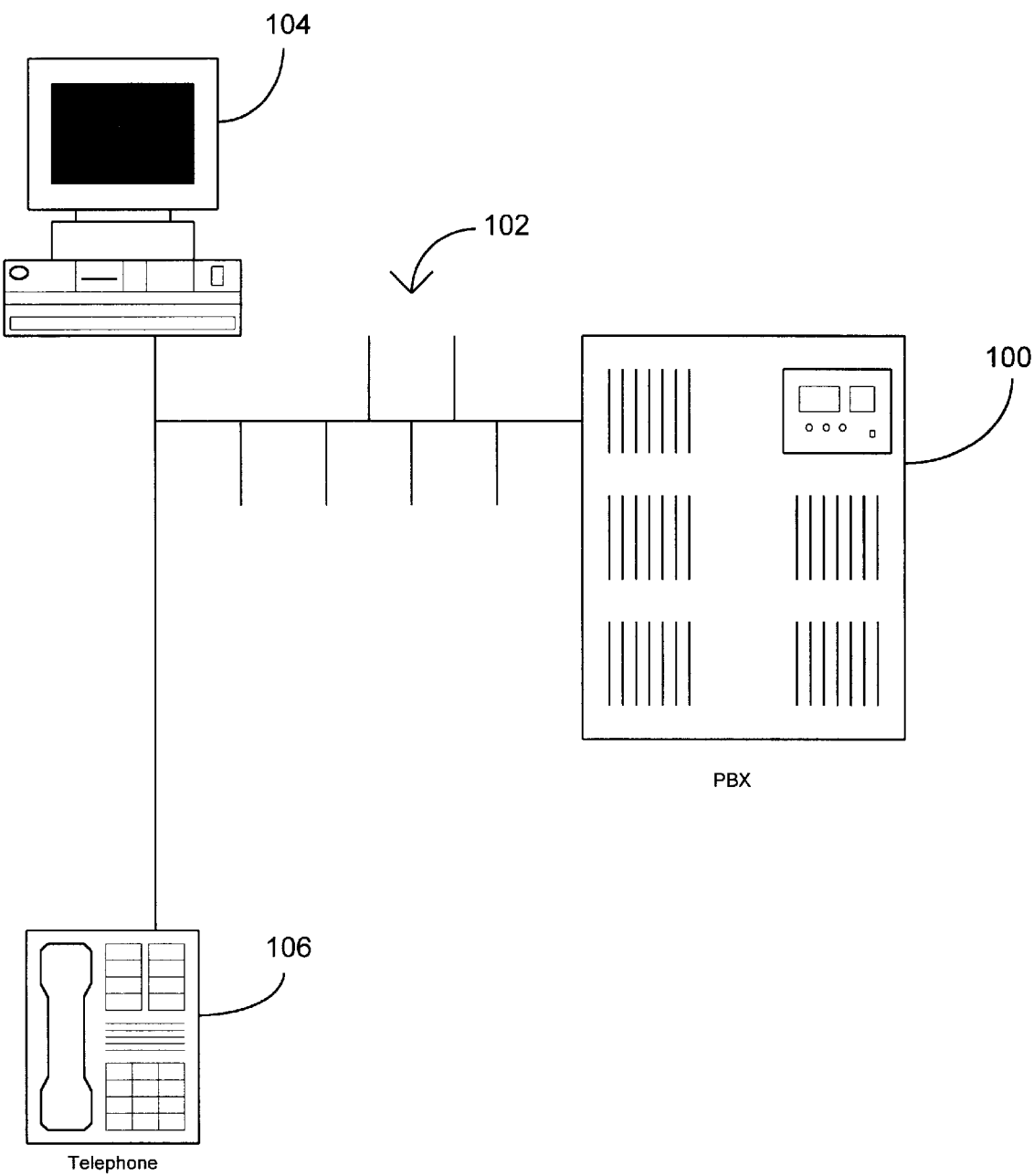
FIG. 1 illustrates a prior art environment for utilization of an ISDN line.
Figure 2:
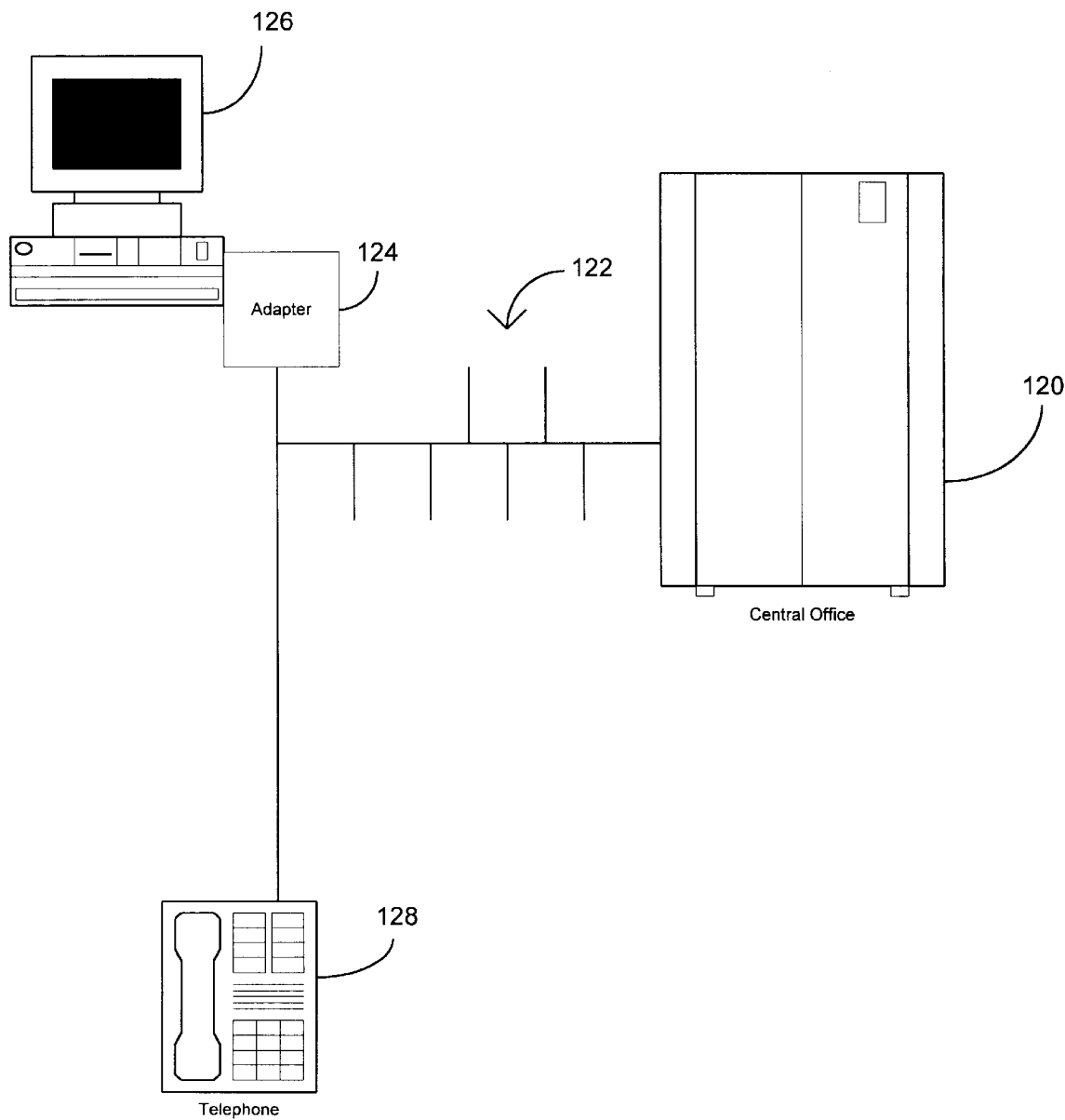
FIG. 2 illustrates an environment for a data device which provides protection against B-channel contention.
Figure 3:
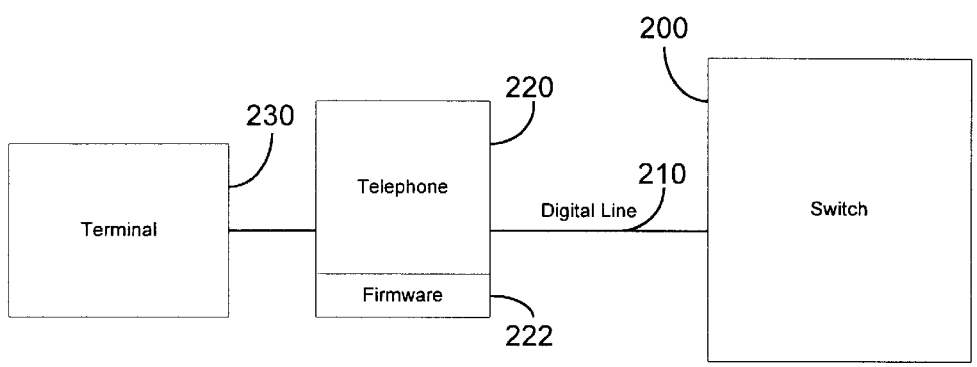
FIG. 3 illustrates an environment for a first embodiment of the present invention.

FIG. 3 illustrates an environment for a first embodiment of the present invention. Switch 200 can be, for example, a PBX or a central office switch. Digital line 210 can be an ISDN line or any other type of digital line. In this embodiment, telephone 220 includes firmware 222 and is connected to switch 200 via digital line 210. Firmware 222 can be placed anywhere within telephone 220. For example, firmware 222 can be located inside an adapter which can be plugged into telephone 220. Terminal 230 is directly connected to telephone 220. Terminal 230 can be, for example, a personal computer or a video display terminal. In one embodiment of the present invention, firmware 222 assumes that high quality video should be given preference over voice calls. In this arrangement, voice calls are automatically routed to a voice mail messaging system. Messages can currently be automatically forwarded to a voice mail messaging system by using the presently available DO NOT DISTURB feature (DND). As an alternative, the user can identify which voice calls should be given priority over a high quality video display. For example, individuals calling from particular telephone numbers, identified via the CALLER ID feature, can be given priority such that the high quality video display is interrupted, and the voice call is provided to the user at telephone 220.

In another embodiment of the present invention, the user can determine if a high quality video display should have priority over voice calls, or if voice calls should have priority over a high quality video display. In addition, firmware 222 can be configured such that if a user picks up a telephone during a video conference which is utilizing both B-channels, a message is provided to the user which states that the incoming lines are in use. A user could then provide a command which drops one of the B-channels and allows the user to use telephone 220 for a voice call. Firmware 222 can monitor when both B-channels are in use and can provide a visual indication on telephone 220. This visual indication may be used to indicate when telephone 220 is not available for use, or the visual indication may be used to indicate that a channel carrying data will be dropped if the user picks up the receiver on telephone 220.

A table can be utilized in the present embodiment to track the B-channels for both data and voice calls. This would assist in the automatic transfer of voice calls to a voice mail system. B-channel tables are currently available in some switches. These tables list all types of calls along with their priority. Calls can then be routed based on their destination, priority and previously stored routing instructions. Many of today's systems treat data and voice calls differently and cannot balance the priorities. The table in the preferred embodiment of the present invention can be indexed by the connection endpoint suffix (CES) and can contain the call reference value of the call along with the selected B-channel. The connection endpoint suffix refers to the device number in an ISDN network and is used to direct the call to the proper device.

In this arrangement, when a B-channel is being used, the B-channel is marked as busy. If the second B-channel is then requested by the data terminal, firmware 222 automatically sends a DO NOT DISTURB feature activation to the voice device handler to activate forwarding of all voice calls to a voice mail messaging system. An indication could also be sent to telephone 220 to indicate that both B-channels are in use. In the preferred embodiment, this indication provides a visual indication on telephone 220 such that the user knows when both B-channels are in use. Firmware 222 then continues to monitor the B-channels. When a B-channel is released, firmware 222 automatically sends a remove feature activation to the voice device handler to remove the forwarding feature. Any visual indication (e.g., LED display) is then cleared on telephone 220 to indicate to the user that voice calls can now originate from telephone 220.

Figure 4:
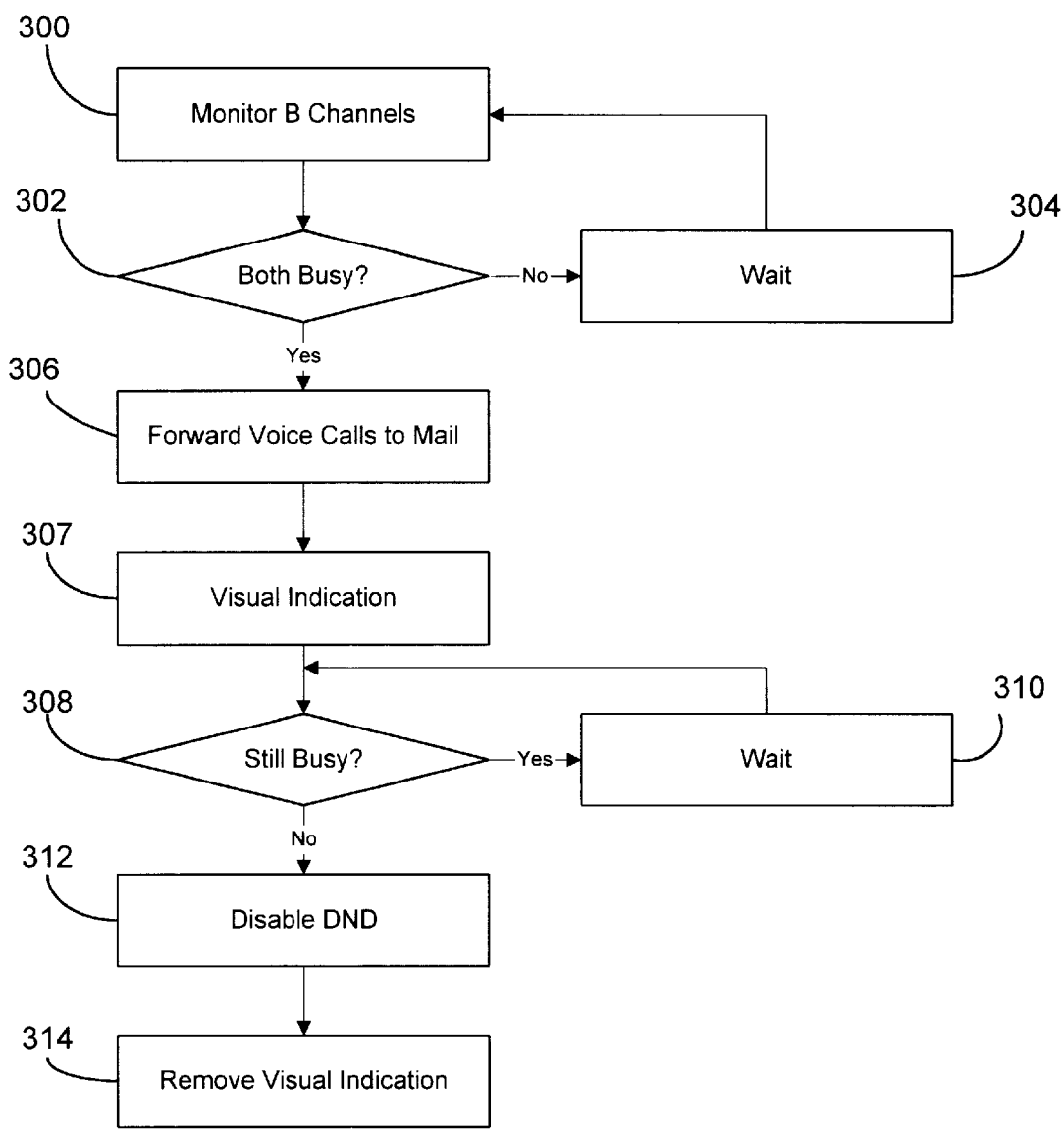
FIG. 4 illustrates a process flowchart for an embodiment of the present invention.

FIG. 4 illustrates a process flowchart for an embodiment of the present invention. At step 300, the system monitors both of the B-channels. At step 302, the system checks if both B-channels are being used for data transfer. If both B-channels are not busy, the system waits at step 304. The system then returns to step 300 and monitors both B-channels. If both B-channels are busy, the system moves to step 306. At step 306, all voice calls are automatically forwarded to a voice mail messaging system. At step 307, a visual indication is provided on the user telephone such that the user knows that if a call is originated from the telephone, the quality of the data transferred to terminal 230 will be greatly degraded. Step 307 is an optional step. At step 308, the system checks if both B-channels are still busy. If both B-channels are still busy, the system waits at step 310. The system then returns to step 308. If one or both B-channels becomes available, the automatic forwarding of voice calls is disabled at step 312. The visual indication is then removed at step 314. Step 314 is an optional step. The system could be triggered to mark the B-channel busy when a SET-UP/SETUP_ACK/CONNECT message or a SET-UP is received. When a B-channel later becomes available, the system could be triggered by the DISCONNECT/REL/REL_COM message to set the table entry for that B-channel to idle. This would indicate that the B-channel is available for data or voice transfer.

Figure 5:
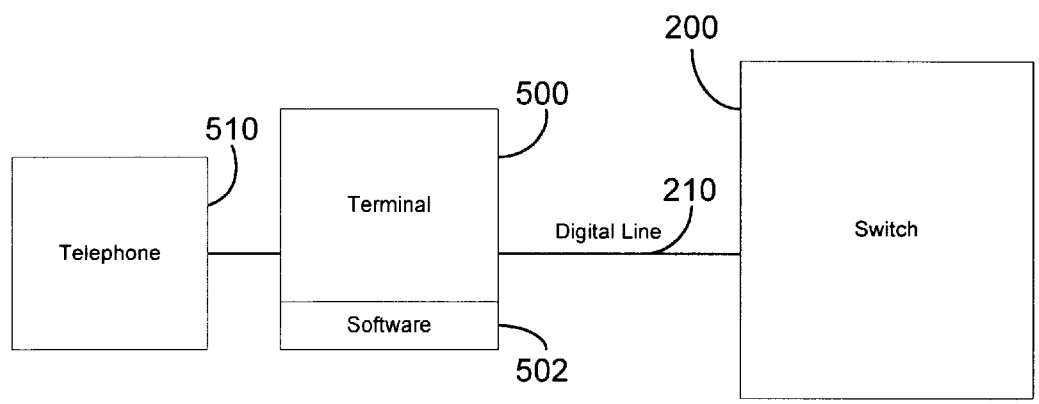
FIG. 5 illustrates an environment for a second embodiment of the present invention.

FIG. 5 illustrates an environment for a second embodiment of the present invention. In this embodiment, switch 200 is connected to terminal 500 via digital line 210. Terminal 500 includes software 502 and is directly connected to telephone 510. In this arrangement, software 502 provides the same line and call control as firmware 222 provided in the first embodiment of the present invention (see FIG. 3).

Figure 6:
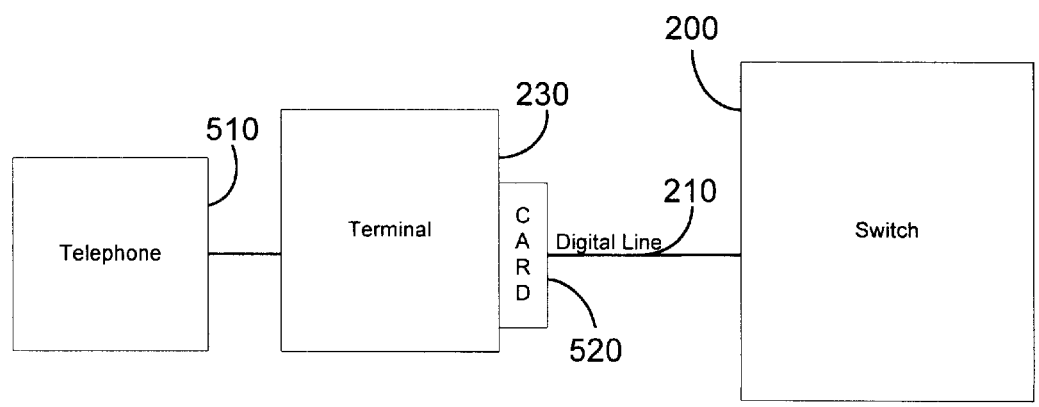
FIG. 6 illustrates an environment for a third embodiment of the present invention.

FIG. 6 illustrates an environment for a third embodiment of the present invention. Switch 200 is connected to terminal 230 via digital line 210 and hardware card 520. Terminal 230 is also directly connected to telephone 510. In this embodiment, card 520 provides the same line and call control that was provided by firmware 222 the first embodiment of the present invention (see FIG. 3).

Figure 7:
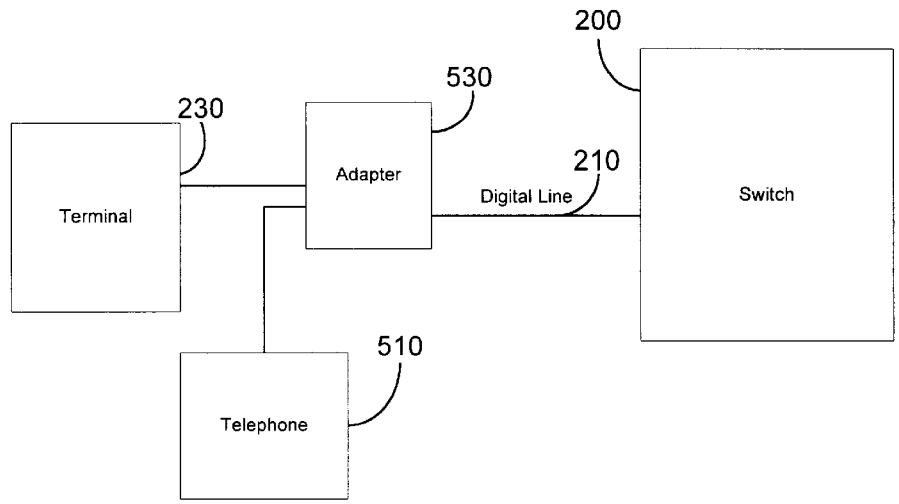
FIG. 7 illustrates an environment for a fourth embodiment of the present invention.

FIG. 7 illustrates an environment for a fourth embodiment of the present invention. Switch 200 is connected to adapter box 530 via digital line 210. Adapter box 530 is directly connected to both terminal 230 and telephone 510. In this embodiment, adapter box is a data module which provides the same line and call control as that provided by firmware 222 in the first embodiment of the present invention (see FIG. 3).

Figure 8:
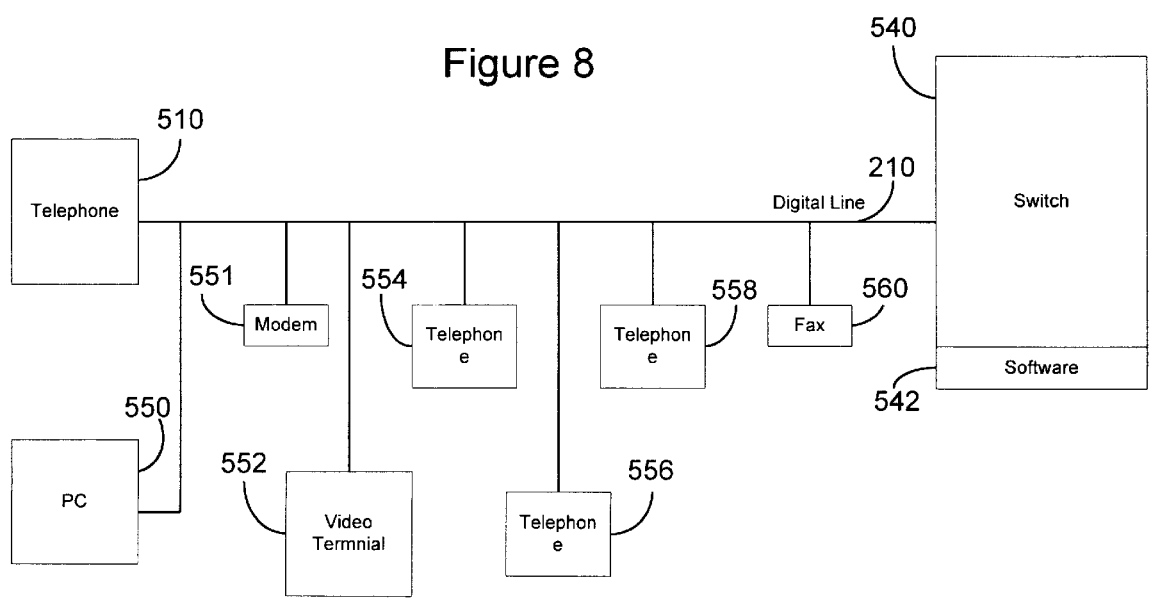
FIG. 8 illustrates an environment for a fifth embodiment of the present invention.

FIG. 8 illustrates an environment for a fifth embodiment of the present invention. In this embodiment, switch 540 includes software 542. Software 542 provides the same line and call control provided by firmware 222 in the first embodiment of the present invention (see FIG. 3). In this example, digital line 210 is connected to eight separate input/output terminals. These input/output terminals are, for example, telephone 510, personal computer 550, modem 551, video terminal 552, telephone 554, telephone 556, telephone 558 and facsimile machine 560. As stated above, usually only two B-channels are available on an ISDN line although eight input/output devices can be connected to one ISDN line. Software 542 can be used to prioritize input/output devices 510, 550, 551, 552, 554, 556, 558 and 560. By prioritizing the input/output devices, the user can determine which input/output devices will be interruptible and which input/output devices will always be provided with a B-channel, or multiple B-channels, after a call has been established. For example, if video terminal 552 has been given priority over telephone 510, when two B-channels are being used to provide video terminal 552 with a video display, voice calls directed to telephone 510 will be automatically forwarded to the user's voice mail messaging system.

Software 542 can be used to control more than one digital line and prioritize between more than eight input/output devices which are connected to the multiple digital lines. Finally, software 542 can be configurable such that a user can set priorities and determine how each call will be handled. For example, if both B-channels are being used for data transmission (e.g., for a high quality multimedia call), the user can provide an incoming voice call with an automatic forwarding to a voice mail messaging system, with a busy signal, with an automatic forwarding to an alternate line (e.g., to an assistant) or with a recorded message. Additionally, the user can allow the caller to determine the urgency of the call. In this arrangement, before a caller is transferred to a voice mail messaging system, the caller is asked if the call is urgent. If the caller identifies the call as urgent (e.g., by entering a #1 after a prompt), one of the B-channels which is carrying data is dropped and then used for the incoming voice call.

What is claimed is:

1. A method for monitoring channels and controlling video and voice calls, comprising the following steps:

monitoring multiple channels, the multiple channels provided by at least one digital line;

determining when at least one of the multiple channels is available;

accepting user choice of priority; and when an incoming call arrives and no channel is available:
automatically forwarding the incoming call to a mail messaging system when the user choice is priority for established calls; and
automatically make a channel available for receiving the incoming call when the user choice is priority for incoming calls.

2. The method for monitoring channels and controlling video and voice calls of claim 1, further comprising the following steps:

providing information to an output terminal when there is an incoming call; and a user makes the choice of priority based on the information provided.

3. The method for monitoring channels and controlling video and voice calls of claim 1, wherein the automatic forwarding generates a DO NOT DISTURB signal to a voice device handler.

4. The method for monitoring channels and controlling video and voice calls of claim 3, wherein the automatically making a channel available removes the DO NOT DISTURB signal.

5. The method for monitoring channels and controlling video and voice calls of claim 1, further comprising the step of updating a table with information when one of the multiple channels becomes occupied and when one of the multiple channels becomes available.

6. The method for monitoring channels and controlling video and voice calls of claim 5, wherein the table is used to determine when all of the multiple channels are occupied and when one of the multiple channels becomes available.

7. The method for monitoring channels and controlling video and voice calls of claim 1, wherein the digital line is an ISDN line.

\* \* \* \* \*